US 6,594,031 B1

(12) United States Patent
Taima (10) Patent No.: US 6,594,031 B1
(45) Date of Patent: Jul. 15, 2003

(54) PRINTER CONTROL UNIT AND METHOD, A RECORD MEDIUM RECORDING A PRINTER CONTROL PROGRAM AND A PRINTER SYSTEM

(75) Inventor: Katsuyuki Taima, Hiratsuka (JP)

(73) Assignee: Minolta Co., Ltd., Osaka (JP)

(*) Notice: Subject to any disclaimer, the term of this patent is extended or adjusted under 35 U.S.C. 154(b) by 0 days.

(21) Appl. No.: 09/400,221

(22) Filed: Sep. 21, 1999

(30) Foreign Application Priority Data

Sep. 21, 1998 (JP) .............................. 10-266757

(51) Int. Cl.[7] .............................................. G06K 15/00
(52) U.S. Cl. ........................................ 358/1.15; 358/1.1
(58) Field of Search ................................... 358/1.1, 1.13, 358/1.15, 1.16, 1.17, 524, 403, 402; 710/2, 8, 10, 14, 33, 52, 62, 64, 65, 68, 74

(56) References Cited

U.S. PATENT DOCUMENTS 5,580,177 A * 12/1996 Gase et al. .................... 400/61
5,832,191 A * 11/1998 Thorne ........................ 358/1.15

FOREIGN PATENT DOCUMENTS

JP          5-75768         3/1993

* cited by examiner

Primary Examiner—Arthur G. Evans
(74) Attorney, Agent, or Firm—Morrison & Foerster LLP (57) ABSTRACT

A printer control system including a printer control device for controlling plural printers connected thereto via a network and providing image data transmission to plural printers by using a single bitmap memory. The printer control system provides high compression of image data when the bitmap memory is used by any of the printers thereby producing an empty area in the bitmap memory for image data transmission to other printers.

11 Claims, 4 Drawing Sheets

PRINTER CONTROL UNIT AND METHOD, A RECORD MEDIUM RECORDING A PRINTER CONTROL PROGRAM AND A PRINTER SYSTEM

RELATED APPLICATION

This application is based on an application No. Hei 10-266757 filed in Japan, the entire content of which is hereby incorporated by reference.

BACKGROUND OF THE INVENTION

1. Field of the Invention

The present invention relates to a unit and method for controlling printers connected via a network, a record medium recording a control program, and a printer system.

2. Description of the Related Art

With recent expansion of a networked office environment, an increased number of printers are used in connection to PCs (personal computers) via networks. Likewise, a growing number of digital copiers also used as the printers are connected to PCs via networks. Consequently, mixed networks interconnecting PCs, printers and digital copiers have increased.

Such printers and digital copiers incorporate printer control units. The printer control unit requires more memory to cope with recent progress in digitization, color printing capability and speedup of the printers.

For instance, a printer generally called a page printer requires an image memory for at least one page print job. For more effective presentation of high-speed capability, the printer must have an even larger image memory. Further, an increasing number of printers are capable of printing both sides of sheets for paper saving purposes stemming from the current environmental problems. Such a printer requires a memory twice as large as a printer for one side print has, because the image memory must have capacity for data of a two-page print job. On the other hand, a color printer must have a memory eight times as large as a memory of a monochromatic printer. A color printer of a 257-step gradation requires a memory eight times as large as a memory of a printer of a two-step gradation. In a color printer of 400 dpi and the 256-step gradation, for example, a quantity of image data for an A4 size print is about 60 MB, requiring a memory of a corresponding capacity.

Because of restriction on access speed to the memory, the printer control unit requires a semiconductor memory as a usable memory (an expansion memory for expanded image data). That is, printer control unit is expensive, including lots of semiconductor memories.

For effective use of the expensive printer control unit, a system has been proposed wherein a single printer control unit is contained in a casing independently from the printer and digital copier rather than incorporated in each printer and digital copier, thereby providing control of plural printers and digital copiers connected via a network.

Unfortunately, the following problem is encountered in the system wherein a single printer control unit controls plural printers.

In a case where the printer control unit has only as much memory as to provide control of one printer, it is impossible to control a plurality of printers at a time. That is, an image memory with the double capacity is required for simultaneous control of two printers. This presents a serious problem in terms of costs.

To solve this problem, it is contemplated to compress image data for image memory saving.

Recently, image data compression techniques have been applied in many fields. For instance, there has been proposed a technique applied to a digital complex system providing operation controls through selective connection of a copier unit, facsimile function unit and the like (Japanese Unexamined Patent Publication No. 5(1993)-75768). In this system, a data compression ratio is selected such that a compression ratio of the facsimile function unit differs from a normal ratio of the copier unit, the facsimile function unit requiring a high speed processing for telephone charge saving.

SUMMARY OF THE INVENTION

It is an object of the invention to solve the aforementioned problem.

It is another object of the invention to provide a printer control unit and method which provide simultaneous control of a plurality of printers connected via a network.

It is still another object of the invention to provide a printer control unit and method which provide simultaneous control of a plurality of printers connected via a network without using a large memory.

These and other objects are attained by a printer control unit which comprises an interface for receiving image data from an external source and for transmitting image data to external printers, a memory storing the received image data; and controller for compressing the received image data for transmission to a second printer and storing the compressed image data in the memory when image data in the memory is transmitted to a first printer The above objects are attained by a printer control unit which comprises an interface for receiving image data from an external source and for transmitting image data to external printers, a memory for storing image data, first controller for compressing the received image data at a first compression ratio and storing the compressed image data in the memory, and second controller for compressing the received image data for transmission to a second printer at a second compression ratio and storing the compressed image data in the memory when image data is being sent from the memory to a first printer.

The invention itself, together with further objects and attendant advantages, will best be understood by reference to the following detailed description taken in conjunction with the accompanying drawings.

BRIEF DESCRIPTION OF THE DRAWINGS

In the following description, like parts are designated by like reference numbers throughout the several drawings.

DESCRIPTION OF THE PREFERRED EMBODIMENTS

One embodiment of the invention will hereinbelow be described with reference to the accompanying drawings.

Figure 1:
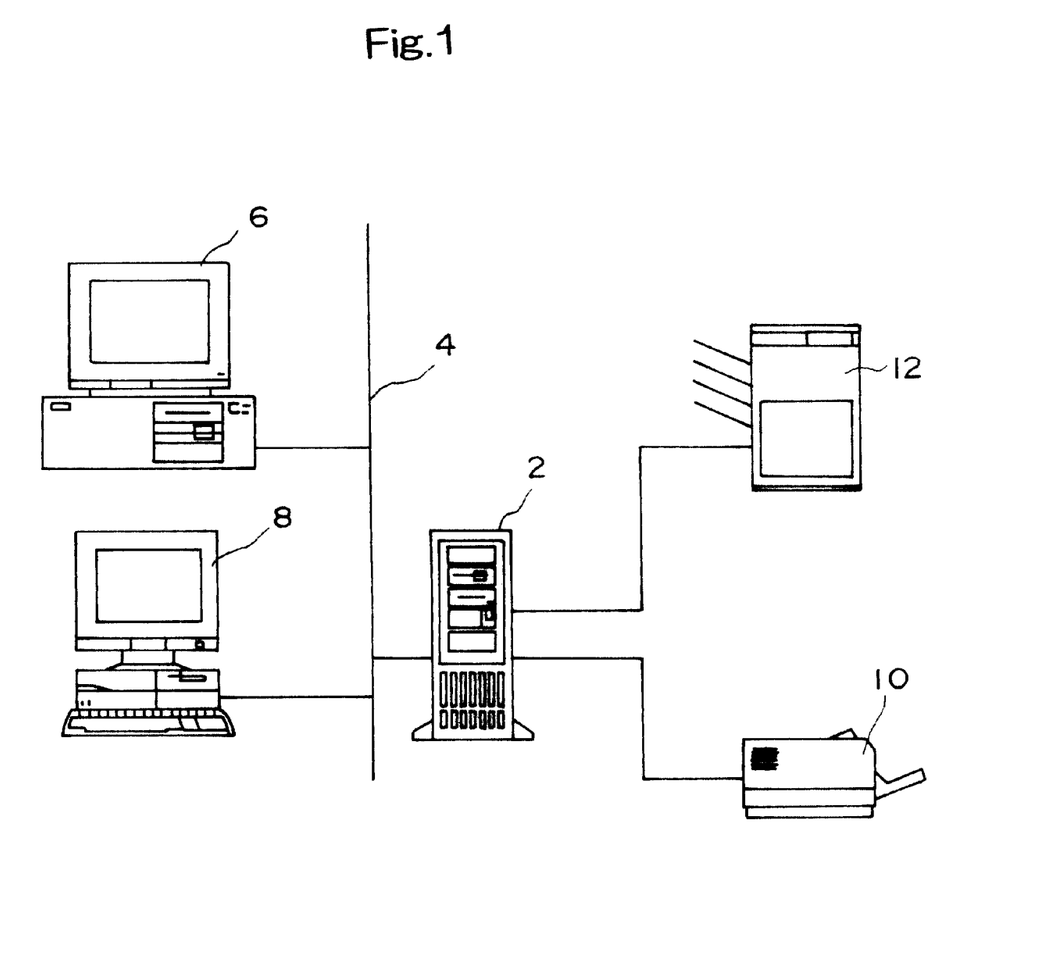
FIG. 1 is a diagram showing connection between a printer control unit and peripheral devices.

FIG. 1 illustrates a connection between a printer control unit 2 and peripheral devices.

PC6 and PC8 are personal computers connected to the printer control unit 2 via a communication medium 4. When directing a print job to be done, PC6 and PC8 are capable of giving instructions (hereinafter, information on such instructions is referred to as "printer information") for designating a printer to be used, permitting change to the image compression ratio and the like. Accordingly, image data generated by PC6 or PC8 together with the printer information are applied to the printer control unit 2 via the communication medium 4.

A printer 10 and a digital copier 12 are independently connected to the printer control unit 2 for performing printing operations based on image data outputted from the printer control unit 2.

The printer control unit 2 is adapted to temporarily store the image data outputted from either or both of PC6 and PC8, to process (compress/decompress) the image data based on the printer information and expand the image data in a bitmap memory (expansion memory), and to output the expanded data selectively to the printer 10 or the copier 12.

The printer control unit 2 operates as follows.

In a first case where PC6 outputs image data designating the printer 10, the printer control unit 2 temporarily stores the image data, sequentially converting the data into bitmap data for output to the printer 10. Where PC6 outputs image data designating the copier 12, as well, the printer control unit 2 temporarily stores the image data, sequentially converting the data into bitmap data for output to the copier 12. The printer control unit 2 operates the same way as above when PC8 outputs image data designating the printer 10 or the copier 12.

In a second case where PC6 and PC8 output image data pieces designating the printer 10 at a time, the printer control unit 2 temporarily stores both the image data pieces, converting either of the image data pieces, in favor thereof, into bitmap data for output to the printer 10 because only one bitmap memory is available. Briefly, the printer control unit stores all the image data pieces at a time and sequentially converts the stored data into bitmap data for output to the designated printer 10. The printer control unit 2 operates the same way as above when both PC6 and PC8 simultaneously output image data pieces designating the copier 12.

In a third case where PC6 outputs image data designating the printer 10 (with no permission of change to the image compression ratio) while at the same time PC8 outputs image data designating the copier 12, the printer control unit 2 temporarily stores both the image data pieces and converts either of the image data pieces, in favor thereof, into bitmap data for output to either the printer 10 or the copier 12, because only one bitmap memory is available. Briefly, the printer control unit stores the image data pieces at a time and sequentially converts the stored data into bitmap data so that, if the printer 10 is given the priority, the control unit first outputs the converted data to the printer 10 and then to the copier 12 after the printer 10 completes its print job. The printer control unit 2 operates the same way as above in a case where PC6 outputs image data designating the copier 12 while at the same time PC8 outputs image data designating the copier 12. In the third case, either of the printer 10 and the copier 12 must wait for its counterpart to complete the printing operations although it is actually ready to perform the printing operations. This obstructs the speedup of the printers.

The invention is applicable to the third case, presenting its working effect when the change of the image compression ratio is permitted. With permission of the change to the image compression ratio, the printer control unit 2 refers to the printer information for selecting image data compression of a higher compression ratio when PC6 outputs the image data designating the printer and at the same time PC8 outputs the image data designating the copier 12 (the above-mentioned third case) The image data compressed at the higher compression ratio is expanded in an empty area of a single bitmap memory so as to be outputted to the copier 12. This permits both the printer 10 and the copier 12 to be used.

In this manner, the printer control unit effectively use the bitmap memory for accomplishing the speedup of the printers.

Figure 2:
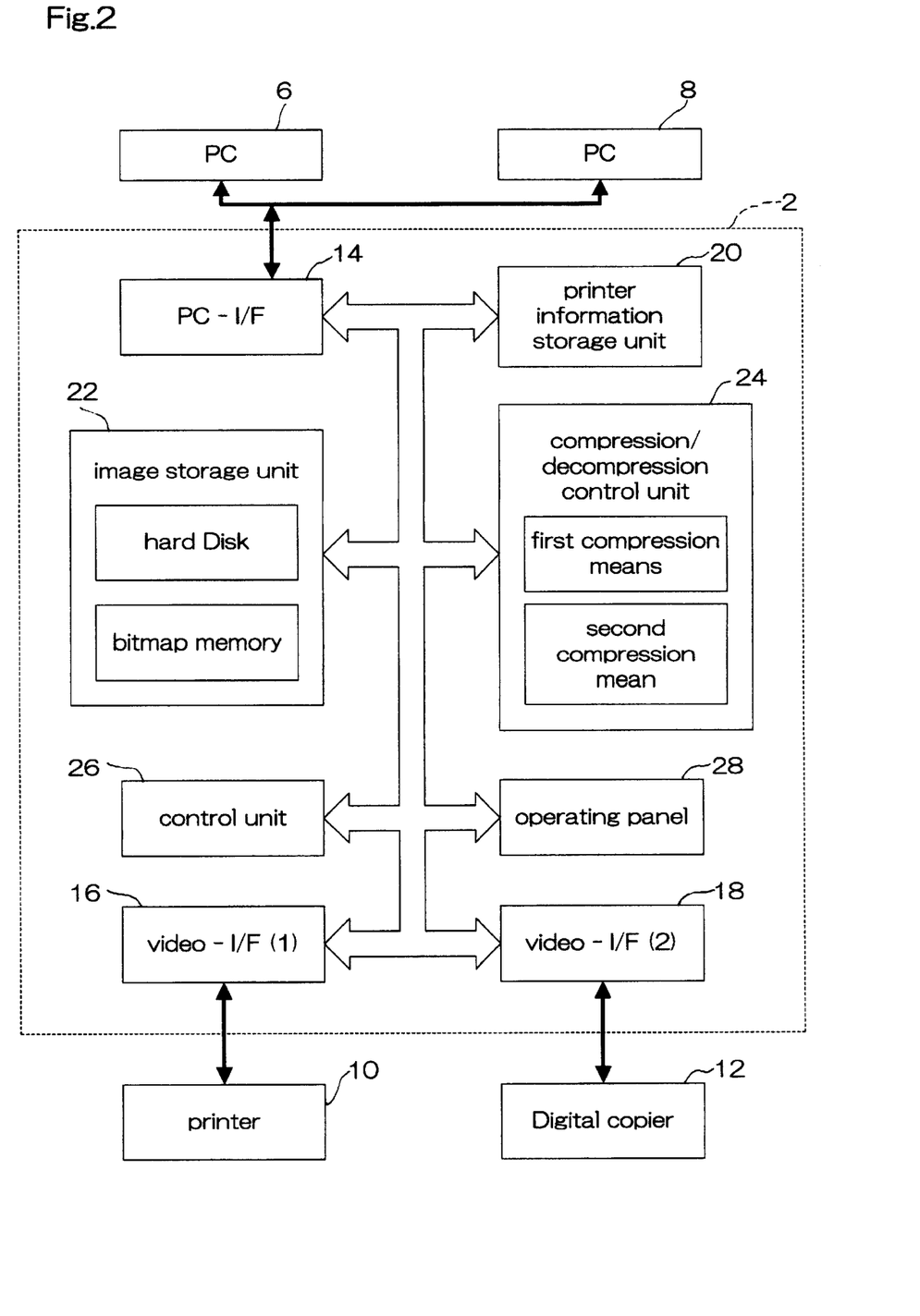
FIG. 2 is a block diagram schematically showing an arrangement of the printer control unit.

A specific arrangement of the printer control unit 2 serving this purpose is shown in FIG. 2 which is a schematic diagram of the printer control unit 2 according to the invention.

PC-I/F 14 is an interface to both PC6 and PC8, serving to receive image data and printer information outputted from either or both of them.

A video I/F(1) 16 is an interface to the printer 10, serving to output image data in the bitmap memory to the printer 10. A video I/F(2) 18 is an interface to the copier 12, serving to output image data in the bitmap memory to the copier 12.

A printer information storage unit 20 stores the printer information (including information as to whether the change of the image compression ratio is permitted or not) received via the PC-I/F 14.

An image storage unit 22 stores the image data and consists of a memory, such as a hard disk, for temporarily storing (saving) the image data received by the printer control unit 2 via the PC-I/F 14, and a bitmap memory (expansion memory) wherein the image data is expanded immediately before subjected to the printing operations, the image data having been temporarily stored in the memory like the hard disk and processed (compression/decompression) based on the printer information.

A compression/decompression control unit 24 compresses/decompresses the image data temporarily stored (saved) in the memory, such as the hard disk, of the image storage unit based on the printer information stored in the printer information storage unit 20. The compression/decompression control unit 24 includes compression means for compressing the image data, the compression means including image compression means with a normal image compression ratio (not shown) and image compression means with a higher compression ratio than the above (not shown).

A control unit 26 is responsible for general control of the printer control unit 2. When PC6 outputs image data designating the printer 10, for example, the control unit 26 determines whether or not the copier 12 is carrying out a print job based on image data applied by PC8 designating the copier 12. When PC6 outputs image data designating the copier 12, as well, the control unit 26 determines whether the printer 10 is carrying out a pint job or not. The control unit 20 operates the same way as above when PC8 outputs image data designating the printer 10 or the copier 12.

When determining the copier 12 to be performing the print job based on the image data from PC8 designating the copier 12 at the receipt of image data from PC6 designating the printer 10, the control unit 26 selects, from the compression/decompression control unit 24, the image compression means with the compression ratio higher than normal on condition that the printer information in the printer information storage unit 20 permits the image compression ratio to be changed, and segments the single bitmap memory (expansion memory) present in the image storage unit 22 into an memory area for the printer 10 and an memory area for the copier 12.

Therefore, the image data pieces temporarily stored in the memory, such as the hard disk, of the image storage unit 22 and respectively designating the printer 10 and the copier 12 are compressed at the compression ratio higher than normal and expanded in correspondingly given areas of the single bitmap memory (expansion memory). Then, the image data pieces are respectively outputted to the printer 10 and the copier 12 via the video I/F(1) 16 and the video I/F(2) 18 for printing.

An operating panel 28 is provided for permitting an operator to instruct operations of the printer control unit 2.

When directing a print job to be done, a user can record the printer information as to the permission of change to the image compression ratio in the printer information storage unit 20 by means of a printer driver (not shown) or the like. A temporary storage buffer and memory for device operations, except for the memory for storage of the image data, reside in the control unit 26.

As described above, when PC6 outputs the image data designating the printer 10, for example, the control unit 26 determines whether or not the copier 12 is performing the print job based on the image data from PC8 designating the copier 12. The control unit 26 may make such determination according to any of the following methods which include: checking the copier 12 to determine whether the copier is actually in printing operation or not; checking the printer control unit 2 to determine whether the image data designating the copier 12 is supplied from PC8 or not; checking the memory like the hark disk or the bitmap memory of the image storage unit 22 to determine whether the image data designating the copier 12 is stored therein or not, and the like.

Figure 3:
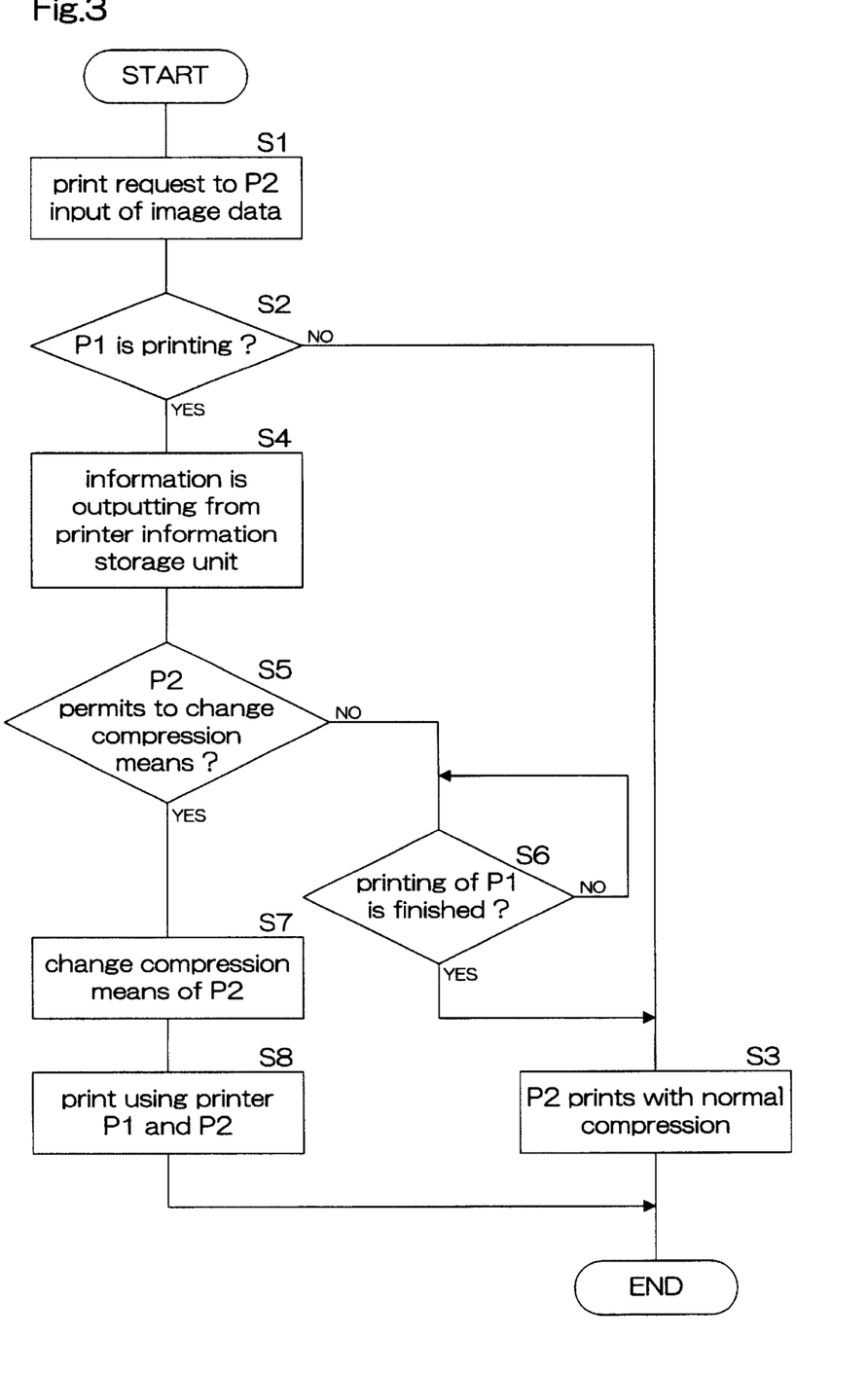
FIG. 3 is a flow chart representing specific steps of an exemplary procedure of a printer control method wherein image compression means for one printer is changed.

The printer control unit of the above arrangement according to the invention performs the following processing which is discussed with reference to a flow chart of FIG. 3 representing specific steps of an exemplary process taken by the printer control unit 2 of the invention.

According to the processing shown in FIG. 3, whether the printer 10 is in printing operations or not is determined when image data designating the copier 12 is outputted from PC6 or PC8. If the printer 10 is determined to be in printing operations, the printer 10 continues the printing operations while the image compression means with the higher image compression ratio is selected based on an information piece included in the printer information and pertaining to the permission of change to the image compression ratio. The selected image compression means, in turn, compresses the image data designating the copier 12 at the higher compression ratio and expands the data in the bitmap memory (expansion memory), thereby permitting the copier 12 to perform its print job.

In the illustration shown in the flow chart, the printer 10 and the copier 12 are represented by reference characters P1 and P2, respectively.

Where image data designating the copier 12 (P2) is outputted from PC6 or PC8 and temporarily stored in the memory such as the hard disk of the image storage unit 22 (inputted to the printer control unit 2), the control unit 26 responds to the image data designating the copier, determining whether the printer 10 (P1) is in printing operations or not (S1, S2).

Where the printer 10 (P1) is determined not to be in printing operations, the control unit 6 selects the image compression means with the normal compression ratio from the compression/decompression control unit 24. Then, the image data compressed by the image compression means with the normal compression ratio is expanded in the bitmap memory (expansion memory) of the image storage unit 22 so as to be subjected to the printing operations at the copier 12 (P2). Thus, the image data compressed at the normal compression ratio is printed when only the copier 12 performs the print job (S3).

Where, on the other hand, the image data designating the copier 12 (P2) is inputted to the printer control unit 2 and the printer 10 (P1) is determined to be in printing operations (S2), the control unit enters a mode to change the image compression means. Specifically, the control unit 26 selectively fetches an information piece as to whether or not the copier 12 (P2) permits the change to the image compression means from the printer information stored in the printer information storage unit 20 (S4), thereby to determine whether the copier 12 (P2) permits the image compression means to be changed or not. If it is determined that the copier 12 (P2) does not permit the change of the image compression means (S5), the copier 12 waits for the completion of a print job already being performed by the printer 10 (P1) (S6) and then prints the image data processed by the image compression means with the normal compression ratio (S3).

If, on the other hand, it is determined that the copier 12 (P2) permits the image compression means to be changed, the control unit 26 selects the image compression means with the higher compression ratio from the compression/decompression control unit 24 (S7). Along with the image data designating the printer 10, the image data designating the copier 12 is compressed by the image compression means thus selected and expanded in the bitmap memory (expansion memory) of the image storage unit 22 so that both the printer 10 and the copier 12 perform their respective print jobs, dispensing with the need for the copier to wait until the printer 10 completes its print job.

Briefly, only in the case where the image data designating the copier 12 (P2) is inputted to the control unit 2 during the printing operations of the printer 10 and the copier 12 (P2) permits the image compression means to be changed, the copier 12 performs the print job based on the image data compressed at the higher image compression ratio than normal.

Now, a specific example of the above operations will be described as below. Provided that both the printer 10 and the copier 12 are capable of printing a color image on an A4-sheet in maximum size at a resolution of 400 dpi and in a 256-step gradation. In this case, the image data includes about 30 MB for each element color, thus totaling to about 120 MB combining respective data pieces for C(cyan), M(magenta), Y(yellow) and K (black). The bitmap memory has a capacity of 64 MB. The printer and the copier employs compression techniques which include irreversible JPEG (compression ratio 30:1) for high compression and reversible JPEG (compression ratio 2:1) for low compression.

Where the printer 10 is performing a print job, the image data is compressed based on the reversible JPEG, thus occupying about 60 MB of the bitmap memory. When at this time, a print request is issued to the digital copier 12 permitting the high data compression, the image data is compressed based on the irreversible JPEG such as to be reduced to about 4 MB. Accordingly, an empty space (about 4 MB) of the bitmap memory is used for image data transmission to the digital copier 12, permitting the printing operations.

When directing a print job to be done, the user may enter the permission/inhibition of the change to the image compression ratio through a printer driver panel (not shown).

Next, a second embodiment of the invention will be described with reference to the flow chart shown in FIG. 4.

After image data to be printed by the digital copier 12 is outputted from PC6 or PC8 and temporarily stored in the memory, such as the hard disk, of the image storage unit 22, whether the printer 10 is in printing operations or not is determined (S11, S12).

If the printer 10 is not printing, the compression/decompression control unit 24 selects first image compression means for image data compression (S13). If the printer 10 is printing, the control unit 26 enters the mode to change the image compression means.

The control unit 26 fetches the printer information stored in the printer information storage unit 20 (S14) so as to check the image data output to be printed by the digital copier 12 and the image data being printed by the printer 10 for determining whether the change to the compression ratio is permitted or not (S15, S16).

Where neither of the image data pieces permits the change to the compression ratio, the image data output to be printed by the digital copier 12 is compressed by the first image compression means after the completion of the print job of the printer 10, and then subjected to the printing operations (S17, S13).

Where both the image data pieces permit the change to the compression ratio, the control unit 26 enters a mode to switch the image compression means from the first image compression means to second image compression means with the higher compression ratio for changing the compression ratio of these image data pieces.

However, the image data piece under the printing operations of the printer 10 at this point of time is already compressed by the first image compression means so that an image data portion for one page print, for example, is expanded in the bitmap memory. Accordingly, the control unit is in wait state until the image data portion expanded in the bitmap memory is printed (the bitmap memory is freed) before switching the image compression means (S18).

When the bitmap memory is freed, the control unit selects the second image compression means (S19) and segments the bitmap memory into a memory area for the printer 10 and a memory area for the digital copier 12 (S20).

In this case, the second image compression means may compress the data at a compression ratio of about 1/4. Briefly, the second image compression means is capable of compressing an image data piece of about 120 MB for an A3 print to about 30 MB. Accordingly, the bitmap memory of about 64 MB is allowed for simultaneous image data feeding to the two printers.

Subsequently, an unprinted image data portion of the image data to be printed by the printer 10 and the image data to be printed by the digital copier 12 are temporarily stored in the memory, such as the hard disk, of the image storage unit 24 and compressed at the higher compression ratio than normal. The compressed image data pieces are expanded in the respective memory areas of the bitmap memory so as to be subjected to the printing operations of the printer 10 and the digital copier 12, respectively (S21)

Specifically, in a mode wherein the image data temporarily stored in the hard disk is compressed on a page-by-page basis and an image data portion for one page print is expanded in the bitmap memory, if at the input of the image data to the digital copier 12, the printer 10 has already produced three page prints based on the image data portion compressed by the first compression means and an image data portion for the fourth page print is being expanded in the bitmap memory, for example, the control unit waits for the expansion memory to be freed by sending the image data portion for the fourth page print and then switches to the second image compression means with the higher compression ratio.

Thus, of the image data printed by the printer 10, the image data portion for the first four page prints is compressed by the first image compression means whereas the remaining image data portion for prints succeeding the fourth page is compressed by the second image compression means with the higher compression ratio. On the other hand, the whole image data piece to be printed by the digital copier 12 is compressed by the second image compression means with the higher compression ratio.

Figure 4:
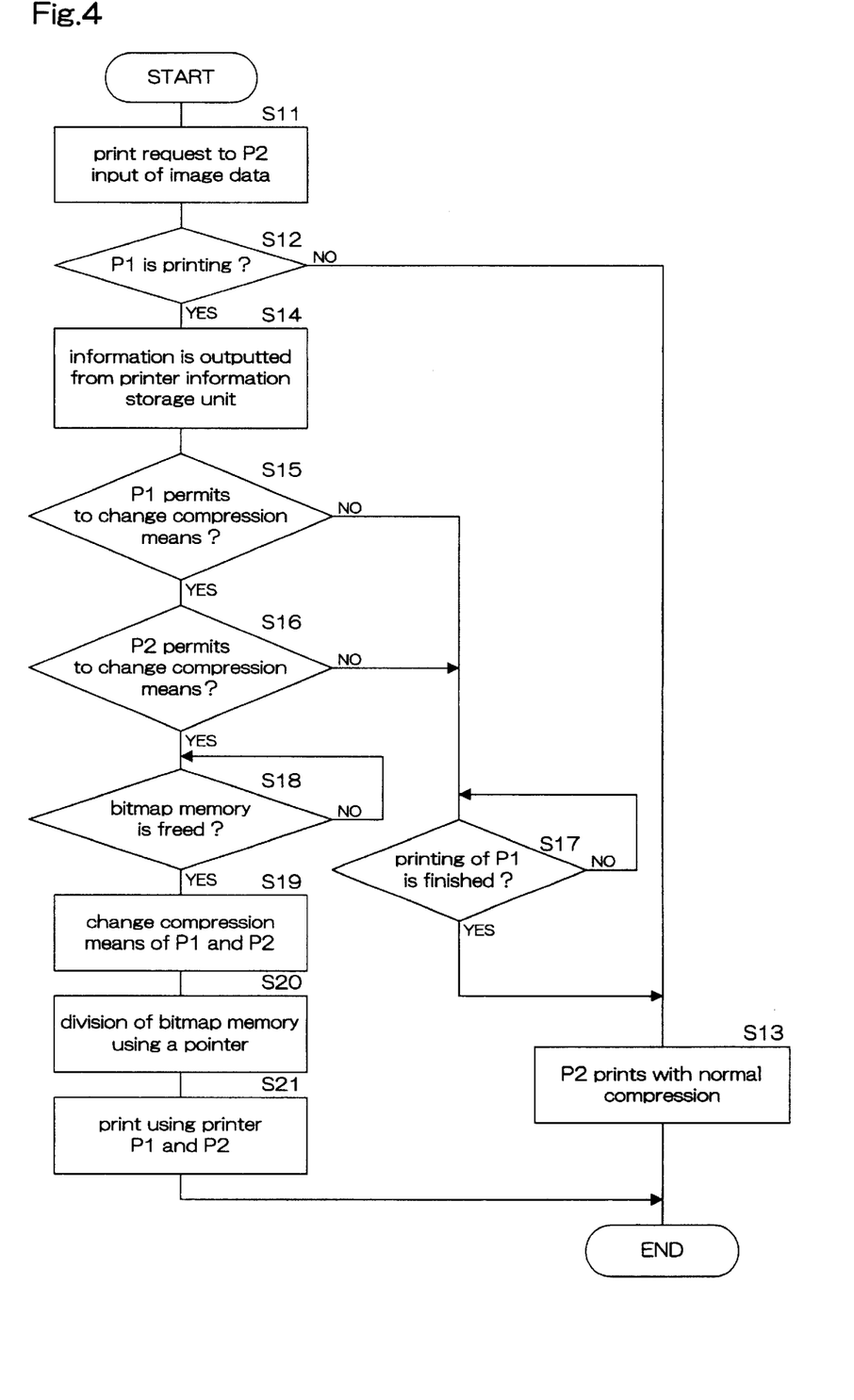
FIG. 4 is a flow chart representing specific steps of an exemplary procedure of the printer control method wherein the image compression means for plural printers is changed.

The illustration with reference to the flow chart of FIG. 4 discusses the case where the printer 10 and the digital copier 12 are used. However, the invention is applicable to a system where three or more printers are connected via a network.

The processing may be performed as follows. Where the image data is inputted from any one of a group consisting of three or more printers, whether any one or ones of the other printers are in printing operations or not is determined. If the other printer(s) are determined to be printing and all the image data pieces permit the change to the compression ratio, then the second image compression means with the higher compression ratio may be selected.

The embodiment of the invention is discussed by way of an example where two image compression means with different compression ratios are provided but three or more image compression means with different compression ratios may be provided.

It is also possible that a program describing the procedure shown in FIG. 4 is recorded to a record medium to be read by the computer, and the technical idea of the invention is implemented by the printer control unit and the computer constituting a portion of the printer system using the record medium.

The invention copes with a plurality of print requests issued to the printers at a time, providing simultaneous processing of the print jobs for avoiding increased printing time. This permits a plurality of printers in connection via a network to be controlled without adding a large memory.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. A printer control unit comprising:
   an interface for receiving image data from an external source and for transmitting image data to external printers;
   a memory storing the received image data; and
   storage means, when image data in the memory is transmitted to a first printer, for compressing the received image data for transmission to a second printer and storing the compressed image data in the memory.

2. A printer control unit comprising:
   an interface for receiving image data from an external source and for transmitting image data to external printers;

a memory for storing image data;

first storage means for compressing the received image data at a first compression ratio and storing the compressed image data in the memory; and second storage means, when image data is being sent from the memory to a first printer, for compressing the received image data for transmission to a second printer at a second compression ratio and storing the compressed image data in the memory.

3. The printer control unit as claimed in claim 2, wherein the second compression ratio is higher than the second compression ratio.

4. A printer control unit comprising:

an interface for receiving image data from an external source and for transmitting image data to external printers;

a first memory for storing the received image data;

first compression means for expanding the received image data and for compressing the expanded image data at a first compression ratio in the first memory;

second compression means for expanding the received image data and for compressing the expanded image data at a second compression ratio in the first memory;

a second memory for storing the image data compressed by the first and second compression means;

storage means, when image data for transmission to a second printer is received while a first image data is transmitted to a first printer from the second memory, for changing the compression ratio of the first image data to the second compression ratio from the first compression ratio and for compressing the second image data at the second compression ratio; and transmission means for transmitting, from the second memory, the first image data to the first printer and the second image data to the second printer.

5. The printer control unit as claimed in claim 4, wherein the second compression ratio is higher than the second compression ratio.

6. A printer control unit connected to a first printer and a second printer via a communication medium, comprising:

an interface unit to which image data is inputted from an external source;

first and second image compression means for compressing the image data inputted thereto via the interface unit;

judging means for determining whether the first printer is in printing operations or not when image data to be printed by the second printer is inputted via the interface unit; and image compression control means which causes the first image compression means to compress the image data inputted via the interface unit to be printed by the second printer when the judging means determines the first printer to be in printing operations, and causes the second image compression means to compress the image data to be printed by the second printer when the first printer is determined not to be in printing operations.

7. The printer control unit as claimed in claim 6, wherein a compression ratio of the first image compression means is higher than that of the second image compression means.

8. The printer control unit as claimed in claim 7, further comprising:

a memory shared by the first and the second printers; and storage-area segmenting means for segmenting a storage area of the memory into an area for the first printer and an area for the second printer when the judging means determines that the first printer is in printing operations.

9. A printer control method applied to a printer control unit connected to a first printer and a second printer via a communication medium and having first and second communication compression means, wherein whether the first printer is in printing operations or not is determined at the input of image data to be printed by the second printer, and wherein if the first printer is determined to be in printing operations, the first image compression means is used for compressing the image data to be printed by the second printer whereas if the first printer is determined not to be in printing operations, the second image compression means is used for compressing the image data to be printed by the second printer at a compression ratio different from that of the first image compression means.

10. A record medium recording a control program for controlling a printer control unit connected to a first printer and a second printer via a communication medium and having first and second image compression means, the control program of which comprises the steps of:

inputting image data from an external source to an interface unit of the printer control unit;

determining whether the first printer is in printing operations or not at the input of image data to be printed by the second printer;

causing the first image compression means to compress the image data to be printed by the second printer when the first printer is in printing operations; and causing the second image compression means to compress the image data to be printed by the second printer at a compression ratio different from that of the first image compression means when the first printer is not in printing operations.

11. In a printer system where in a plurality of printers at least including a first printer and a second printer and a printer control unit for controlling the printers are interconnected via a communication medium, the printer control unit comprising:

an interface unit to which image data is inputted from an external source;

first and second image compression means for compressing the image data inputted via the interface unit;

judging means for determining whether the first printer is in printing operations or not when image data to be printed by the second printer is inputted via the interface unit; and image compression control means which causes the first image compression means to compress the image data inputted via the interface unit to be printed by the second printer when the judging means determines that the first printer is in printing operations, and which causes the second image compression means to compress the image data to be printed by the second printer when the first printer is determined not to be in printing operations.

* * * * *

UNITED STATES PATENT AND TRADEMARK OFFICE
CERTIFICATE OF CORRECTION

PATENT NO.    : 6,594,031 B1
DATED         : July 15, 2003
INVENTOR(S)   : Katsuyuki Taima It is certified that error appears in the above-identified patent and that said Letters Patent is hereby corrected as shown below:

<u>Column 9,</u>
Line 11, change the second "second" to -- first --.
Line 39, change the second "second" to -- first --.

Signed and Sealed this

Seventh Day of October, 2003

JAMES E. ROGAN
*Director of the United States Patent and Trademark Office*